June 14, 1932. G. H. HUFFERD ET AL 1,862,933
TIE ROD END
Filed July 1, 1929
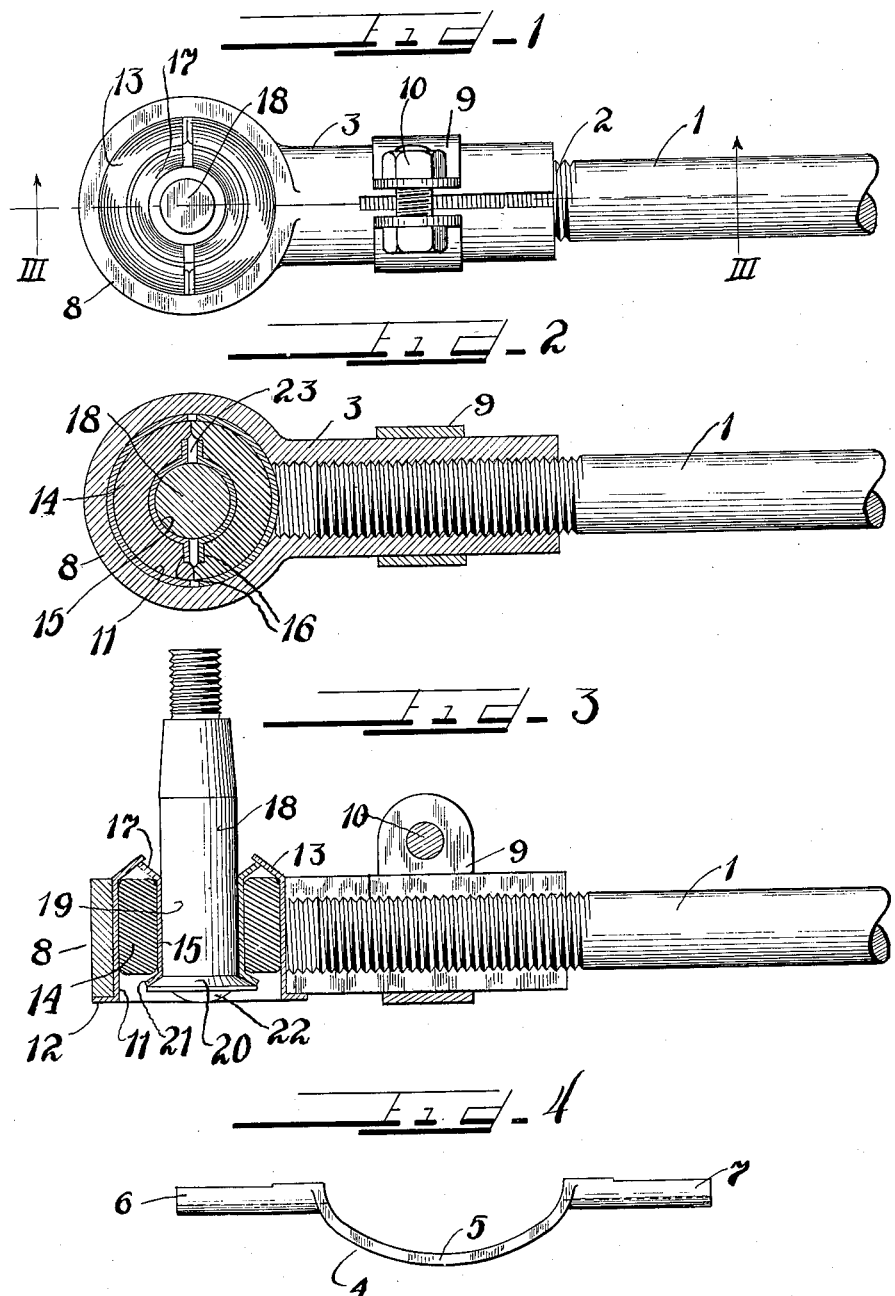
Inventors
George H. Hufferd
Matthew P. Graham Patented June 14, 1932

1,862,933

UNITED STATES PATENT OFFICE

GEORGE H. HUFFERD AND MATTHEW P. GRAHAM, OF DETROIT, MICHIGAN, ASSIGNORS TO THOMPSON PRODUCTS, INCORPORATED, OF DETROIT, MICHIGAN, A CORPORATION OF OHIO

TIE ROD END

Application filed July 1, 1929. Serial No. 375,008.

This invention relates to a tie rod end and more particularly to a tie rod end bearing assembly for use in the steering mechanism of automotive vehicles.

It is an object of this invention to provide a flexible bearing assembly including the tie rod and stud associated therewith equivalent in action to the well known ball joint connections usually provided in steering mechanism and formerly considered as a necessary form of construction to provide the limited universal movement necessary to take care of variations in alignment of the parts of the steering mechanism.

It is a further important object of this invention to provide a tie rod end bearing assembly that can be manufactured much more inexpensively than a ball joint, while at the same time being self-adjusting to take care of wear and providing sufficient friction between bearing surfaces and resiliency of bearing assembly to prevent play and rattle.

Other and further important objects of this invention will be apparent from the disclosures in the specification and the accompanying drawing.

This invention, in a preferred form, is illustrated in the drawing and hereinafter more fuly described.

In the copending application of Matthew P. Graham, entitled "Tie rod end", Serial No. 268,433, there is disclosed a bearing assembly including a stud or pin having a cylindrical bearing surface, a split oilless bushing cooperating therewith and a resilient ring member associated with said bushing to provide for angular movement of the stud with respect to the tie rod end. The present invention constitutes a modification and improvement of the invention disclosed in that application.

On the drawing:

Figure 1 is a top plan view of a tie rod end bearing assembly embodying the principles of our invention.

Figure 2 is a longitudinal sectional view of the same, with parts in elevation.

Figure 3 is a sectional view taken substantially on line III—III of Figure 1, with parts in elevation.

Figure 4 is a top plan view of a member from which the end socket and housing is formed.

As shown on the drawing:

The reference numeral 1 indicates a tie rod having a threaded end 2 for reception in an internally threaded socket member 3. Said socket member is conveniently formed from a stamped blank 4 (Figure 4) comprising an intermediate arcuate portion 5 and integral semi-cylindrical end portions 6 and 7. The socket end member 3 is formed by bending the blank 4 until the end members 6 and 7 are in abutting relation to form the split socket of said socket member 3. Said arcuate intermediate portion 5 forms a cylindrical housing 8. A yoke or clamp 9 encircling the socket member 3 serves to hold said socket member and tie rod end in permanent engagement by means of a bolt 10 extending through the free flanged ends of said yoke 9.

An outer split sleeve 11, formed in semi-cylindrical sections, is positioned within said cylindrical housing 8 and is provided with a lower flanged edge 12 for engagement with the lower edge of said housing 8. Said cylindrical sleeve 11 is further provided with an upper inwardly inclined flange 13 for a purpose that will later appear.

A split rubber ring 14 is positioned within the outer sleeve 11 and between said outer sleeve 11 and an inner split sleeve 15 formed in semi-cylindrical sections provided with longitudinal flanged edges 16. Said inner sleeve 15 is further provided with an upper outwardly inclined flange 17 adapted to lie within the flanged edge 13 of the outer sleeve 11.

A stud or pin 18 having a cylindrical bearing surface 19 is mounted within the inner split sleeve 15 with its bearing surface 19 in contact therewith. A retaining shoulder 20, preferably a washer of greater diameter than the diameter of the stud 18, is provided on the lower end of said stud 18 for cooperation with a flange 21 formed on the lower edge of the inner sleeve 15. A head 22 is formed on the end of said stud 18 to hold the washer 20 in place. The bearing assembly as a whole is thus prevented from dropping off of the stub 18.

The rubber ring 14 is of such size that it must necessarily be greatly compressed in the assembly of the bearing, that is, by the insertion of the stud 18 within the split inner sleeve 15. The cooperating flanged edges 13 and 17 of the outer and inner sleeves 11 and 15, respectively, retain the rubber ring 14 in position and also in combination with the lower flanged edge 12 of the outer ring 11, prevent separation of the various elements of the bearing assembly.

It should be noted that the complementary sections of the inner shell or sleeve 15 are spaced apart as indicated by the space 23 between the flanged edges 16. This provision permits the sections of the inner shell 15 to be forced into tight bearing contact with the bearing surface 19 of the stud 18 due to the great compression under which the rubber ring 14 is maintained and thus any wear of the bearing surface 19 is automatically compensated for.

The resiliency of the rubber ring 14 and the general construction of the bearing assembly as shown permits of a limited angular movement of the stud 18 with respect to the tie rod 1 in addition to permitting the necessary amount of relatively rotary movement between the two. It has further been found in actual use, that the friction between the bearing surface 19 and the inner surface of the sleeve 15, as well as the torsional stresses set up in the rubber ring 14 provide just sufficient resistance to turning movement of the stud 18 with respect to the tie rod 1 to prevent play without making the act of steering unnecessarily difficult.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A tie rod end bearing assembly comprising a member having a cylindrical housing, inner and outer spaced concentric sleeves within said housing, a resilient bushing held under compression between said sleeves, said sleeves having flanges cooperating with each other and said housing for retaining themselves and said bushing in position in said housing and a stud rotatably mounted within said inner sleeve for bearing contact therewith.

2. A tie rod end bearing assembly comprising an end socket member forming a cylindrical housing, an outer split sleeve within said housing having a lower flanged edge for engaging the lower edge of said housing and an upper inwardly inclined flange, a split rubber ring positioned within said outer sleeve, an inner split sleeve cooperating with said outer sleeve to hold said rubber ring under compression, said inner sleeve having an upper outwardly inclined flange lying within the flange on said outer sleeve, and a stud rotatably mounted and retained within said inner sleeve.

3. A tie rod end bearing assembly comprising an end socket member forming a cylindrical housing, an outer split sleeve within said housing having a lower flanged edge for engaging the lower edge of said housing and an upper inwardly inclined flange, a split rubber ring positioned within said outer sleeve, an inner split sleeve cooperating with said outer sleeve to hold said rubber ring under compression, said inner sleeve having an upper outwardly inclined flange lying within the flange on said outer sleeve, and a stud rotatably mounted and retained within said inner sleeve, there being formed an annular shoulder on the lower end of said stud and a cooperating flange formed on said inner sleeve.

4. In combination, a pair of angularly disposed members, one of said members providing a housing and the other of said members having a cylindrical bearing portion disposed in said housing, a pair of spaced sleeves within said housing enclosing said bearing portion, a split rubber ring enclosed by said sleeves and maintained thereby under great compression and means on said sleeves cooperating with said members and with each other to hold said members in assembled position capable of relatively rotatory and angular movement.

5. In combination a pair of angularly disposed members, one of said members providing a housing and the other of said members having a cylindrical bearing portion disposed in said housing, a pair of spaced sleeves within said housing enclosing said bearing portion, a split rubber ring enclosed by said sleeves and maintained thereby under great compression and flanges on said sleeves cooperating with said members and with each other to hold said members in assembled position capable of relatively rotatory and angular movement.

6. A tie rod bearing assembly, comprising a cylindrical housing, a split sleeve in said housing, a stud having a bearing surface rotatably mounted in said sleeve, a second split sleeve spaced from said first sleeve, means on said sleeves cooperating with each other and with said housing to retain said sleeves in said housing, and a resilient bushing compressed between said sleeves.

7. A tie rod end assembly, comprising a housing having an opening therethrough, a stud having a bearing surface in said opening, a pair of semi-cylindrical sleeves within said housing with their side edges spaced apart, semi-cylindrical resilient bushing members compressed between said sleeves and the walls of said opening, flanges on said side edges for preventing relative rotation of said bushing members with respect to said cylindrical sleeve, means for retaining said sleeves and bushing members in said opening.

8. A tie rod end assembly, comprising a housing, a stud having a bearing surface in said housing, a pair of inner and outer concentric sleeves having a space therebetween, said inner sleeve fitting against said bearing surface and comprising a pair of sections spaced apart at their side edges, flanges on he side edges of said sections, semi-cylindrical bushing members compressed in said space between said sleeves and bearing against the flanges on said inner sleeve to cause the same to grip said bearing surface, and cooperating flanges on one end of each of said sleeves for retaining said bushing members in said housing.

9. A tie rod end bearing assembly, comprising a housing having a bore therein, a rubber ring within said bore, a split bearing sleeve within said ring having integral flanges thereon, means in said housing cooperating with said flanges to retain said ring and sleeve in said housing, and a cylindrical member rotatably mounted in said bearing sleeve.

10. In a tie rod end bearing assembly including a stud having a cylindrical bearing surface and a housing having a cylindrical bore for receiving said stud, a pair of segmental cylindrical bearing sleeves circumferentially spaced about said cylindrical bearing surface in contact therewith, an outer concentric sleeve positioned against the wall of said cylindrical bore and having a lower annular flange engaging the bottom of said housing and an upper inturned flange, a rubber bushing under radial compression between said bearing sleeves and said outer sleeve and a retaining member on the lower end of said stud for securing said housing, sleeves and bushing on said stud said bushing being retained by said retaining member and the inturned flange of said outer sleeve.

In testimony whereof, we have hereunto subscribed our names at Detroit, Wayne County, Michigan.

GEORGE H. HUFFERD.
MATTHEW P. GRAHAM.